US006781593B1

(12) United States Patent
Couwenberg et al.

(10) Patent No.: US 6,781,593 B1
(45) Date of Patent: Aug. 24, 2004

(54) METHOD AND APPARATUS FOR COLOR QUANTIZATION

(75) Inventors: Wilhelmus Johannes Couwenberg, Boekel (NL); Hubertus Marie Jozeph Matheus Boesten, Melick (NL)

(73) Assignee: Océ-Technologies B.V., Venlo (NL)

( * ) Notice: Subject to any disclaimer, the term of this patent is extended or adjusted under 35 U.S.C. 154(b) by 338 days.

(21) Appl. No.: 09/716,992

(22) Filed: Nov. 22, 2000

(30) Foreign Application Priority Data

Nov. 25, 1999 (NL) ............................................. 1013669

(51) Int. Cl.[7] ................................................ G09G 5/02
(52) U.S. Cl. ....................... 345/589; 345/591; 345/597; 345/600; 382/162; 382/164; 382/165; 382/166
(58) Field of Search ................................ 345/589, 591, 345/597, 600; 382/162, 164, 165, 166

(56) References Cited

U.S. PATENT DOCUMENTS

| | | | |
|---|---|---|---|
| 4,853,767 A | | 8/1989 | Sakai et al. |
| 5,058,040 A | * | 10/1991 | Tajima ........................ 345/591 |
| 5,416,890 A | * | 5/1995 | Beretta ........................ 345/590 |
| 5,432,893 A | * | 7/1995 | Blasubramanian et al. . 345/600 |
| 5,544,284 A | * | 8/1996 | Allebach et al. ............. 345/603 |
| 5,734,368 A | * | 3/1998 | Meyers et al. ............... 345/593 |
| 5,734,369 A | * | 3/1998 | Priem et al. ................. 345/605 |
| 6,446,687 B1 | * | 9/2002 | Jukoff ....................... 144/253.6 |

FOREIGN PATENT DOCUMENTS

| | | |
|---|---|---|
| EP | 0292284 | 11/1988 |
| EP | 0705027 | 4/1996 |

* cited by examiner

Primary Examiner—Matthew C. Bella
Assistant Examiner—Manucher Rahmjoo
(74) Attorney, Agent, or Firm—Birch, Stewart, Kolasch & Birch, LLP

(57) ABSTRACT

Quantization of the colors in a digital image within a color space is achieved by successively dividing the colour space into a number of compartments in a number of steps, each compartment containing a subset of the colors of the image. Each step comprises: determining the variance in a predetermined number of directions, of the set of colors in a compartment, the variance being calculated by determining a covariance matrix which describes the colors of the set of colors in the compartment and calculating from the values of the variance of the set in the relevant directions, and dividing the compartment into two new compartments on the basis of the largest variance found. Such a method is further refined by subjecting the resulting sets of colors to a predetermined test and, on the basis of the results of that test, recombining sets, and also the compartments corresponding to the recombined sets. This quantization is intended as preparation of the digital image data for an interpretation processing operation, such as OCR or lay-out analysis. A corresponding apparatus and software are also disclosed.

44 Claims, 4 Drawing Sheets

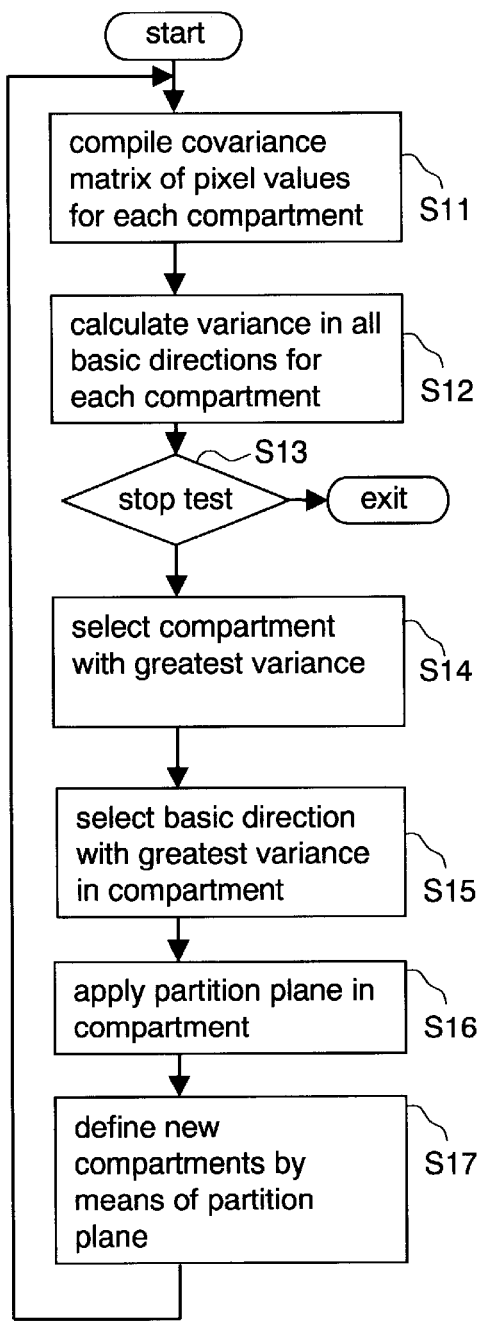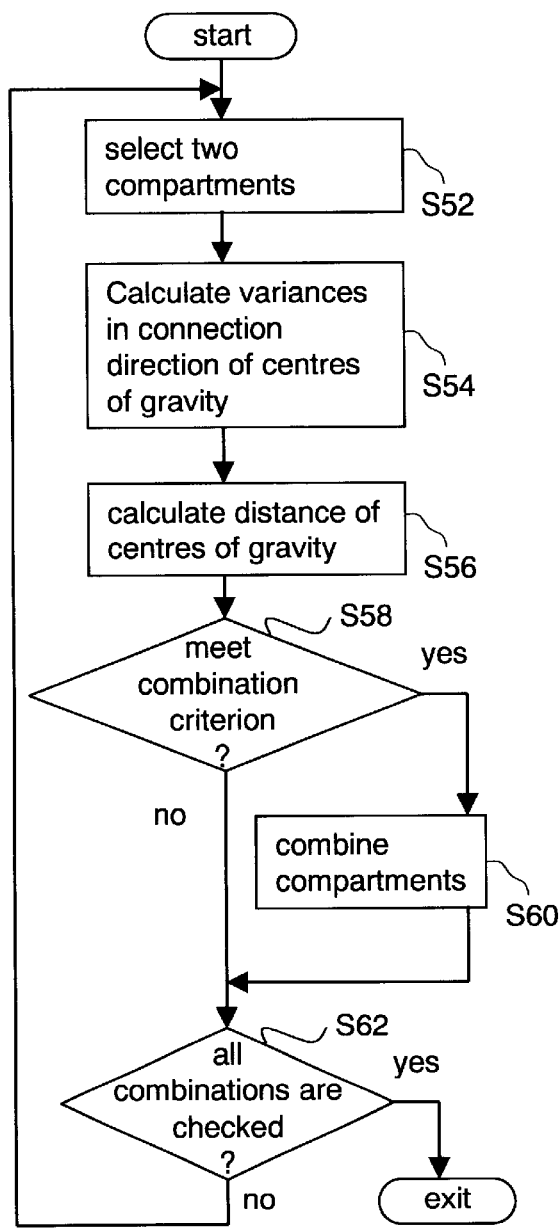
FIG. 3
FIG. 5

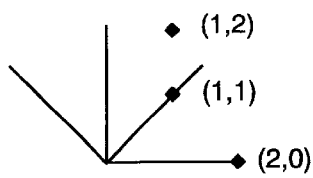

◆ (1,2)
◆ (1,1)
◆ (2,0)

$$x = \{(1,2) + (1,1) + (2,0)\} / 3 = (4,3)/3$$

$$V = 1/3 \cdot \left\{ \begin{bmatrix} 1 \\ 2 \end{bmatrix}(1,2) + \begin{bmatrix} 1 \\ 1 \end{bmatrix}(1,1) + \begin{bmatrix} 2 \\ 0 \end{bmatrix}(2,0) \right\} - 1/9 \cdot \left\{ \begin{bmatrix} 4 \\ 3 \end{bmatrix}(4,3) \right\} =$$

$$= 1/3 \cdot \begin{bmatrix} 6 & 3 \\ 3 & 5 \end{bmatrix} + 1/9 \cdot \begin{bmatrix} 16 & 12 \\ 12 & 9 \end{bmatrix} = 1/9 \cdot \begin{bmatrix} 2 & -3 \\ -3 & 6 \end{bmatrix}$$

$$v(y) = y^t \cdot v \cdot y \;\rightarrow\; v\begin{bmatrix} 1 \\ 0 \end{bmatrix} = 1/9 \cdot \left\{ (1,0)\begin{bmatrix} 2 & -3 \\ -3 & 6 \end{bmatrix}\begin{bmatrix} 1 \\ 0 \end{bmatrix} \right\} = 2/9$$

FIG. 4

METHOD AND APPARATUS FOR COLOR QUANTIZATION

FIELD OF THE INVENTION

The invention relates to a method and apparatus for the quantisation of colours in a digital colour image.

BACKGROUND OF THE INVENTION

The term digital image as used here denotes the digital representation of a document, in which the image information on the document is described by the values of pixels arranged in a raster. These pixel values are frequently collectively referred to as "digital image data". The term quantisation also denotes here the reduction of the number of discrete colours present in the digital image data.

Colours can be described within the framework of a colour space, a space defined by axes which characterise specific aspects of colours. One colour space frequently used is, for example, the RGB space, where the axes contain the intensities of the basic colours red, green and blue. Each colour can be represented by co-ordinates in the colour space.

Documents can often contain very many colours. For many applications, such as reproducing a document image on a monitor screen or hard copy, it is desirable to reduce the number of colours, because many imaging processes can reproduce only a limited number of different colours. There are also applications which process a colour image in order to extract therefrom information concerning the contents, such as optical character recognition (OCR) or lay-out analysis. Such applications are frequently obstructed in their operation if a large number of different colours occur in the document image, because a priori they can make no distinction as to the importance of the different colours. A restriction of the number of colours in the image is then all the more desirable.

A known procedure for quantising the colour range of an image into a limited number of colours is to divide the colour space into a number of compartments, whereafter all the colours situated within a compartment are equated to one colour representative of the entire compartment. A number of such procedures are described in Wan, S. J. et al., "An Algorithm For Multidimensional Data Clustering", ACM Transactions on Mathematical Software, Vol. 14, No. 2 (June 1988), pp. 153–162. In many of the methods described therein, the variance of the sets of colours for division is used to determine the spread of the dots of the set in the possible division directions.

The known methods, however, are complex and divide the colour space only in a restricted number of directions, namely the directions of the axes of the colour space, so that the division effect is poor. The technique used is not particularly suitable for involving in the division procedure directions other than the directions of the axes of the colour space.

SUMMARY OF THE INVENTION

An object of the invention is to solve the said problems of the known methods. To this end, for the purpose of selecting a compartment for division and for the purpose of dividing the selected compartment into new compartments, use is made of the variances of the sets of colours in the compartments in a number of predetermined directions. The variance of the set of colours in a compartment is calculated by determining a covariance matrix which describes this set of colours and calculating therefrom the values of the variance of the set in the relevant directions.

As a result, the division of colour space takes place more effectively and is combined with less computing effort. The covariance matrix is in fact relatively simple to calculate and can be used in simple manner to calculate the variance of the relevant set in an arbitrary direction.

A further improvement of the method according to the invention is achieved by adding procedure steps following the initial division of the colour space, the method further comprising: subjecting resulting sets of colours to a predetermined test; and recombining, on the basis of the results of that test, sets and the compartments corresponding thereto.

The effect of this step is that divisions incorrectly made in the division step, often through other causes, are restored. In this way the final number of colours is further reduced.

Here it should clearly be noted that the method according to the invention does not have as its object to achieve an end result which is as faithful as possible, but rather an image which is very suitable for further interpretation processing.

In another embodiment, the method already described is followed by a post-processing step to remove transition effects along the edges of coloured surfaces in order to prevent their influencing the end result of the quantisation. This post-processing step comprises the application of chain coding.

The invention also relates to the application of the above-described method to a method for the automatic interpretation of a colour image the method comprising: quantising the colours present in the colour image, to a restricted number; making on the basis of the quantisation, a new colour image; interpreting the new colour image. This interpretation step, for example, comprises a classification of image elements into types, such as text elements, photographs and graphic elements, automatic optical character recognition or automatic recognition of securities.

The invention, which includes the quantisation of colours of an image and also the combination of quantisation of colours of an image and interpretation of said image, can be performed in a computer programmed suitably for the purpose and therefore also relates to a computer program and a storage medium on which the computer program is stored.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus do not limit the present invention.

BRIEF DESCRIPTION OF THE DRAWINGS

FIG. 3 is a flow diagram showing the steps in a division process of the colour space according to the invention.

FIG. 4 is a calculation example.

FIG. 5 is a flow diagram showing the steps in a combination process according to the invention.

DETAILED DESCRIPTION OF THE PREFERRED EMBODIMENTS

Figure 1:
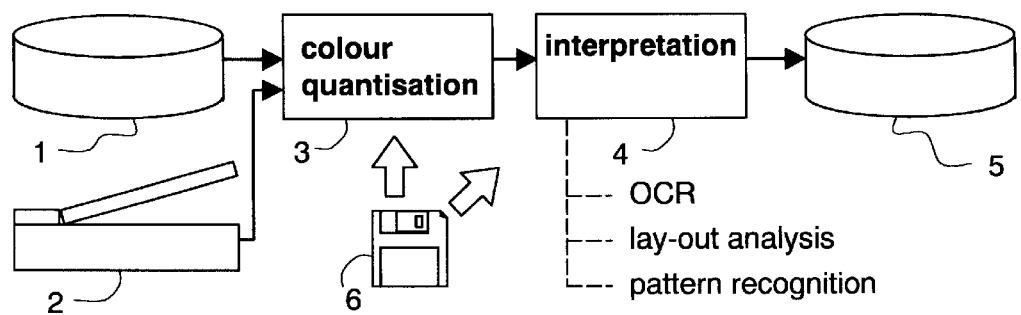
FIG. 1 is a diagram showing an apparatus according to the invention for processing a digital document.

FIG. 1 is a diagram showing an apparatus for processing a digital document containing image information in the form of pixel values in a regular pixel raster. The pixel values specify the colour and degree of coverage of each pixel in the co-ordinates of a colour space. A colour space which is frequently used is the one defined by the intensities of the colours red, green and blue (R, G, B), the co-ordinate values usually being coded with 8 bits per co-ordinate. Other suitable colour spaces, for example, are the L, a, b space and the L, C, H space.

The said digital document is, for example, delivered by a data storage system 1 or a scanner 2, and is intended for processing by an interpretation module 4 to give higher-level information concerning the content of the digital document.

Since image data which may have very many values (in the above case 3×8 bits, i.e. approximately 16 million different values) frequently require considerable processing time in interpretation processes, it is advantageous first to convert the image data into data with fewer possible values before subjecting them to said processes. A reduction processing operation of this kind is carried out by the colour quantisation module 3, which is connected to the data sources 1 (a data storage device) and/or 2 (a scanner). Module 3 transmits the reduced image data to the interpretation module 4. The latter module may comprise one or more of the following processing processes, it being understood that this enumeration has no limiting force: optical character recognition, lay-out analysis, and pattern recognition, such as recognition of securities. The interpretation module 4 is connected to a data storage device 5 for the storage of the interpretation results.

The operation of the colour quantisation module 3 will now be explained in detail. An object of this module is to reduce to a small number, e.g. 3 or 4, the multiplicity of different colours which occur in a colour document. For many interpretation processes this is adequate or even too many. It should be noted that it is therefore not the intention of this invention to have the image which is reduced by the colour quantisation module 3 be similar to the original image to a human observer. Usually it is even unnecessary to give the remaining colours any relationship with reality. It is sufficient to make them distinguishable from one another. This can also be done, for example, by simply coding the remaining colours with a number in the digital representation.

The colour quantisation module 3 and the interpretation module 4 may have the form of a computer program run in a computer. This is indicated symbolically by the computer diskette 6. Of course this can also denote other data storage media.

Figure 2:
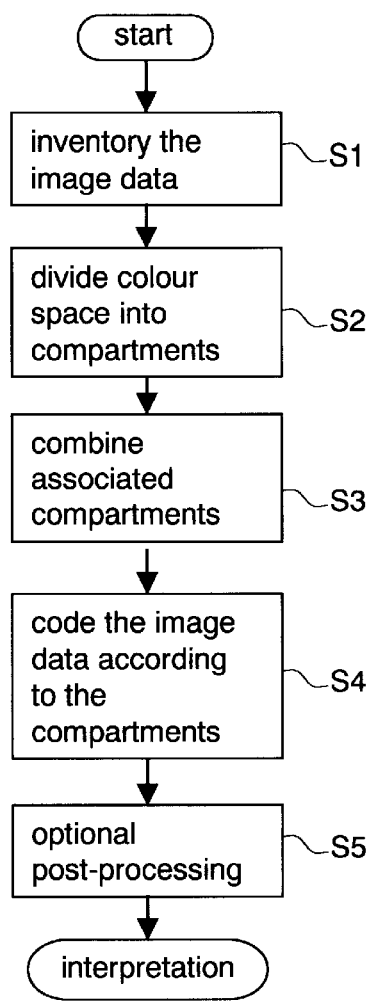
FIG. 2 is a flow diagram showing the main steps in the processing operation according to the invention.

FIG. 2 shows the various main steps in the reduction process. These will first be described overall and then each step will be described in greater detail.

In step S1 the pixel values of the digital document, or a part thereof preselected in a known manner, are inventoried. For this purpose the values of all the pixels of the document can be taken or alternatively a selection thereof, preferably a regular pattern of, for example, every fifth pixel in both main directions, so that the number of pixel values for processing are restricted to $\frac{1}{25}^{th}$ of the initial number. The inventory step can also include a preprocessing treatment, such as filtering or smoothing in order to remove noise and fine raster patterns. Otherwise these might lead to disturbances in the result.

In step S2, the colour space, the R,G,B, space in the example described here, is successively divided up into compartments on the basis of the distribution of the pixel values in the colour space. The division step operates iteratively, in which in each case a compartment, starting with the complete colour space, is divided into two new compartments, and is so arranged that it yields a small number of compartments, e.g. a maximum of 10.

On completion of step S2, the sets of pixel values in the different compartments are analysed in relation to one another in step S3 to determine whether they are correctly separated from one another. If this is not so, the compartments concerned are combined. It may, for example, be that the division has progressed too far, and that as a result a concentration of pixel values belonging to one another (think for example of the background colour of the document which, due to noise in the scanner signal, results in a number of closely situated but different pixel values) has been divided into two. It may also happen that in an early and still coarse division step a small concentration of pixel values has been cut through as a result of the division of large concentrations. If in subsequent finer division steps the two parts of said small concentration are separated from the rest, it is desirable that the two parts should be combined again because in fact they form one concentration. Step S3 is used for this purpose.

In an alternative embodiment, a check is made after each division step as to whether there are incorrect separations. If that is so, those separations are immediately eliminated.

In step S4 all the pixel values of the digital document are coded in accordance with the colour space compartmentalisation found in the preceding steps, namely by coding all the pixel values situated in one compartment as a colour or code which represents that compartment.

If desired, an optional post-processing of the thus processed digital document can be carried out in an optional step S5.

Finally, the pixel values coded in this way are passed to the interpretation module 4.

The procedure followed in step S2 for the division of the colour space into compartments will now be explained by reference to FIG. 3. Before this, however, we shall discuss a few basic principles used here.

In the assessment of a set of pixel values in the colour space, use is made of the form of that set. In most cases the colours in a (digital) document will form one or more concentrations (clusters), dot clouds in space. A document with monochromatic areas in red and green contains only two pixel values (in addition to white for the paper), but in practice colours are rarely monochromatic, and there will be a cloud of pixel values around each of the said colours. If the document contains more colours, then there will be more of such concentrations, and also artefacts from the scanning process or deviations which have occurred during the printing of the scanned document, for example at transitions between colour surfaces, will yield extra dots in the colour space. The set of all the dots (pixel values) has an extension in the colour space in each direction. This can be characterised by the variance of the set in that direction.

The variance of a set of N dots in a specific direction is calculated by projecting all the dots on a vector with the intended direction and calculating the variance of the density distribution of the values (=distance $x_i$ (i∈{1,N}) from a reference point on the vector) in accordance with the formula:

$$v = \sum_{i=1}^{N} x_i^2/N - \bar{x}^2 \quad \text{where } \bar{x} = \sum x_i/N.$$

The set of dots is now divided into two by applying a partition plane perpendicular to the direction in which the set has its greatest extension or variance. This plane is so positioned that the centre of gravity of the set of dots lies in that plane. The theory also applies to spaces with a different number of dimensions, and it is therefore actually better to speak of a hyperplane. In this description the term "plane" is so intended.

Searching for the direction having the maximum variance becomes a simple procedure by using a covariance matrix which describes the spatial distribution of the dots. For this purpose, the positions of the dots in the colour space (the pixel values) are represented as vectors $x_i$. The definition used for the covariance matrix V is:

$$V = \sum_{i=1}^{N} x_i \cdot x_i^t \cdot N^{-1} - \bar{x} \cdot \bar{x}^t$$

where $\bar{x} = \sum x_i/N$ and $\bar{x}^t$ = the transposition of $x$

Using the covariance matrix, the variance v(y) of a set of dots (pixel values) in an arbitrarily selected direction y (defined by a unit vector y) can easily be calculated by applying the formula:

$$v(y)=y^t.v.y$$

Finding the direction with the maximum variance is a simple matter by using the covariance matrix. It is in fact given by the eigenvector with the maximum eigenvalue of the covariance matrix. However, one disadvantage of this approach is that dividing a set of dots in space by an arbitrarily oriented plane sometimes requires complex calculation processes.

In practice, however, it has been found that a limited number of basic directions can be sufficient. In that case the variance can be calculated quickly for all the basic directions. The basic direction with the maximum variance is then selected for defining the partition plane.

In the known methods, the three axis directions in the R,G,B colour space are frequently considered sufficient, but the invention is in part a recognition that this is too coarse a method. The present invention therefore selects a system consisting of the directions of the axes of the colour space used and the directions which divide the angles between each pair of said axis directions. Thirteen basic directions are defined in this way, namely the directions of the vectors (1,0,0), (0,1,0), (0,0,1), (1, ±1,0), (1,0, ±1) (0,1, ±1), (1, ±1, ±1). This system is also very suitable for other colour spaces as mentioned above.

The above considerations will be described by reference to a simple numerical example. FIG. 4 shows a 2-dimensional space similar to the above-defined 3-dimensional space, and in that space the 3 dots (1,2), (1,1) and (2,0). The drawing also shows the covariance matrix and the variance in one exemplified direction (1,0).

The division process as shown in FIG. 3 starts with the calculation of the covariance matrix for the (possibly the selected) pixel values of all the compartments of the colour space (S11). At the start of the procedure, this relates here to the complete colour space and all the (selected) pixel values of the digital document.

In step S12, using the covariance matrix for each compartment of the colour space defined at that time, the variance of the set of pixel values is calculated for each of the basic directions.

A check is then made whether a division is desirable or whether the division procedure should be stopped (S13). Various stop criteria can be used for this check. A first criterion counts the number of compartments defined at that time and compares this with a number previously input by the operator or defined as a default. If the number of compartments is lower than that number, a division pass is carried out, otherwise the division procedure stops.

According to another stop criterion, the variances of the sets in the compartments defined at that time are compared with a preselected threshold value. As long as at least one variance still exceeds the threshold value, a division pass is performed, otherwise the division procedure stops.

If it is concluded that another division pass must follow, then that one of the sets of compartments defined at that time is selected which has the greatest variance (S14), whereafter for that set the basic direction with the maximum variance is selected in step S15.

A partition plane is then applied in step S16 perpendicularly to the selected basic direction and through the centre of gravity of the set (the centre of gravity is the average of the pixel values in the compartment). This partition plane divides the compartment into two new compartments (S17).

The procedure then returns to step S11 for a new division pass.

FIG. 5 shows the procedure followed in combining wrongly partitioned compartments of the colour space as mentioned in step S3 in FIG. 2.

In this procedure, all the combinations of compartments are checked iteratively (steps S52 and S62), the sets of pixel values present in those compartments being tested by a combination criterion. This test is not only performed for adjacent compartments, since it is also possible that two compartments partitioned by a (narrow, for example) part of a third compartment should belong together, and to the part of the third compartment therebetween.

A well usable combination criterion has been found to be:

$$\sqrt{v_1} + \sqrt{v_2} > (1/\sqrt{3})\|d\|^2$$

where $v_1$ and $v_2$ are the variances of the two sets in the direction of connection of their centres of gravity (step S54) and $\|d\|$ is the length of the connection vector of the two centres of gravity (step S56). Other combination criteria also are possible, but the one mentioned here has been found to give good results. If required, the factor $(1/\sqrt{3})$ can be made adjustable for an operator in order to adapt the procedure to a specific document.

When a checked pair of compartments appears to satisfy the combination criterion (step S58), those compartments are combined (step S60) by removing the partition plane between them.

Instead of the combining procedure described above, a recursive procedure can be followed. In a first step of this alternative algorithm, for all pairs of compartments the distance $\|d\|$ between the respective centers of gravity is computed and the compartment pair having smallest distance is selected. In a second step, the selected pair is checked against the combination criterion, and if the check is positive, it is combined. If not, other compartment pairs may be checked and possibly combined.

Then, the algorithm returns to the first step, which is now applied to the new situation, including the new compartment resulting from the combination. The algorithm stops when no compartment pair satisfies the combination criterion, or when the smallest distance exceeds a predefined threshold.

Figure 6:
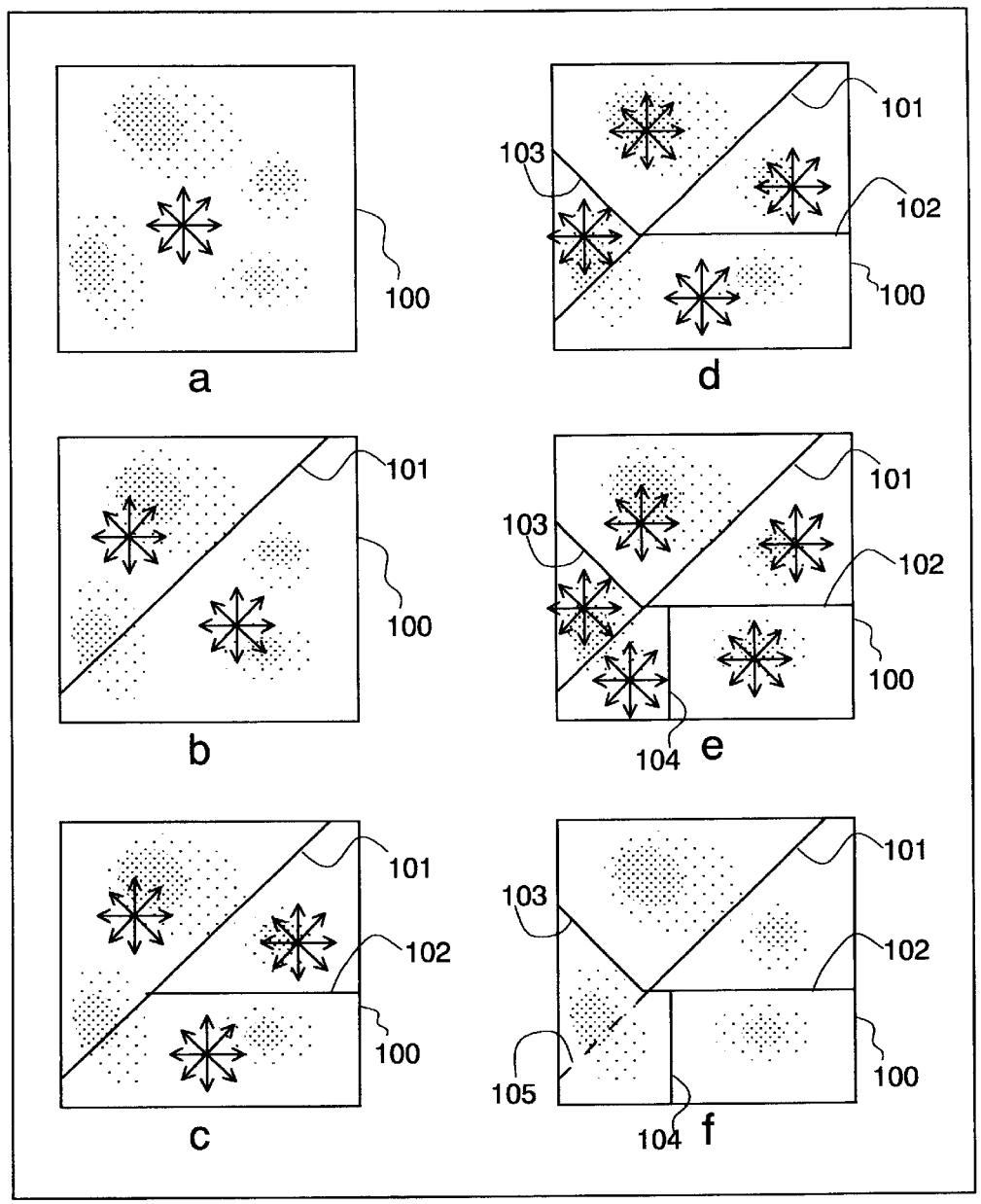
FIG. 6 is a simplified example of a quantisation operation.

The complete procedure of dividing and if necessary re-combining will now be illustrated by a 2-dimensional example. Reference is made to FIG. 6.

Block a represents the colour space 100, containing the colours occurring in an exemplified document. Each dot is a colour. In this example there are four concentrations of colours.

In a first step, the variance of the entire colour space in (four) basic directions is calculated by calculating the covariance matrix and calculating the variances in accordance with the above-described method. In the drawing this is denoted by a star formed by the basic directions. The largest of the calculated variances is selected and a partition plane 101 is applied perpendicularly to the associated direction and through the centre of gravity of the set of dots, see block b.

For each of the resulting subsets, the variances are calculated in the basic directions and the largest is selected. This will be found in the right-hand subset, so that this subset is now divided further, with a partition plane 102, see block c.

The variance in each basic direction is then calculated for all the subsets, whereafter the largest serves as a basis for a following division, with partition plane 103, in block d. This is done once again, resulting in partition plane 104, in block e.

Hereafter none of the subsets appears still to have a variance larger than the threshold value, so that the division process is terminated. In the event that a maximum number of compartments is used as a stop criterion, this number could have been set at 5, and then the division process would also be stopped at that point.

Finally, the test for connected compartments is carried out (S3) and here it is found that the set at the bottom left has wrongly been divided into two by a part 105 of the partition plane 101. Partition plane 105 is therefore removed so that finally four compartments result, see block f.

The compartmentalisation of the colour space is now ready to code the digital image data belonging to the digital document, using a limited number of colours.

A digital document with the colours quantised in this way is much more suitable for an interpretation processing, such as OCR, than a normal colour document, because such processing operations benefit from a small to very small number of levels between which a distinction is to be made. In the case of OCR, for example, it is desirable that the text elements (characters) and the background should each be coloured uniformly and differently from one another. Frequently, however, the background in particular contains small variations in colour, e.g. due to scanner noise, and also, if the background is coloured, through the halftoning of the colour separations.

In an image of this kind it is much more difficult to draw the character boundaries sharply and interpretation is seriously hindered, so that faults occur in the result of the OCR. By now first processing the digital document in accordance with the invention, all the colours of the background are quantised as one colour, and this assists the automatic interpretation.

However, it may happen that deviantly coloured pixels occur along the edges of characters as a result of the scanning or printing process. In a number of cases these wrongly coloured pixels will nevertheless be coded in the same colour as the background by the method according to the invention, but this is not always so. To eliminate these errors, the post-processing described hereinafter can be applied to the pixel map (generalisation of bit map) of the digital document. It should be noted that this post-processing can operate advantageously only if the document has first been quantised.

The post-processing is based on chain coding, introduced by H. Freeman in 1961. In this process, boundaries between differently coloured objects or image elements at pixel level are searched for in a scan line oriented algorithm.

A chain code describes the progress of a borderline with codes from the set {n,w,s,e}, corresponding to the directions ↑,←,↓ and →.

A chain code is termed closed if the beginning and end points coincide.

The borderline of an object has one or more closed chain codes which do not intersect one another (and themselves). By convention, the pixels of the object are always situated at the left-hand edge of the chain code. A closed chain code of an object is termed positively oriented if it rotates anticlockwise (hence encloses the object) and negatively oriented if it rotates clockwise (and hence is enclosed by the object). An isolated pixel thus corresponds to the chain code <nwse>.

The chain code of an object has exactly one positively oriented component—the contour—and possibly one or more negatively oriented components.

The pixel map is processed scan line by scan line. For each object chain codes are updated and expanded for each processed scan line. For each series of pixels in the colour of the object, the chain codes to which the left-hand and right-hand vertical boundaries (one pixel high) belong are now updated. If one or more pixels of the object colour are found which are not connected to pixels of this kind in the preceding scan line, a new chain code is started. If in a scan line no pixels of the object colour are found which are connected to pixels of this kind in the preceding scan line, the ends of the associated chain codes are interconnected and the code is closed. The colour of the object is considered to be any colour which deviates from the (quantised) colour of the background. Consequently, all pixels which do not have the colour of the background are counted as the object.

When the positively oriented chain code of an object, i.e. the outermost contour, is closed, all the pixels which are enclosed by that contour, except for those which are enclosed by a negatively oriented contour, are coloured in with the colour of the object, if the object has at least an extension greater than a predetermined bottom limit. Objects smaller than the bottom limit, typically one or two pixels linear, are removed by colouring them in with the colour of the background. These pixels are mostly the consequence of noise and will only disturb the interpretation. It can also be convenient to apply the chain code processing only to image elements not larger than a certain limit value, in order to prevent image elements other than characters from being treated. These image elements are of no interest to the OCR operation and will thus be ignored.

OCR is referred to here as the interpretation processing operation, but other processing operations can be considered because they benefit from quantisation of the colours present in a colour image. Another example is automatic lay-out analysis as described, for example, in applicants' European Patents EP-B 0 629 078 and EP-B 0 735 833. For other forms of pattern recognition in colour images it is also frequently favourable to reduce the number of colours, and with it the number of parameters requiring separate processing. An important application of pattern recognition is the recognition of securities, such as banknotes. Although the number of colours present there is frequently limited, the digital image thereof delivered by the scanner may contain many more and deviant colours due to variations in lighting and scanner deviations, so that recognition is rendered difficult. By subjecting the digital image to colour quantisation according to the invention, these variations are eliminated and the chance of recognition is much greater.

In one special embodiment, the method described can also contain a step in which an analysed digital image is divided up into parts when the analysis results show that the image contains components with strikingly different character. This will be the case, for example, with a document containing a colour photograph and text. By now noting the positions of the colours in the image, it is possible to determine whether specific concentrations of colours occur only in a specific part of the image. On the basis of this it is possible to decide automatically or by the intervention of an operator to split the image into component parts and then quantise them separately.

Although the invention has been explained by reference to the above-described exemplified embodiment, it is not restricted thereto. The skilled man will consider numerous variations of the invention within the scope of the claims. Such variations are also considered as falling within the scope of protection of the patent.

What is claimed is:

1. A method of quantising colours in a digital image, within a colour space, comprising a—making a set of colours occurring in the image or in a preselected part thereof;

b—iteratively dividing the colour space into a number of compartments in a number of steps, each compartment containing a subset of the colours of the image, each step including
   selecting a compartment for division on the basis of the variances of the existing compartments, and
   dividing said compartment into new compartments, the division being carried out until a predetermined stop criterion is met,
   wherein the selecting of a compartment for division and the dividing of the selected compartment into new compartments is based upon variances of the sets of colours in the compartments in a number of predetermined directions;

c—subjecting resulting sets of colours to a predetermined test and, on the basis of the results of that test, consolidating into previous sets, and the compartments corresponding thereto; and d—coding the colours in the image with a colour or code which represents the compartment in which they are situated.

2. The method according to claim 1, wherein the variance of each set of colours in a compartment is calculated by determining a covariance matrix which describes this set of colours and calculating therefrom the values of the variance of the set in said predetermined directions.

3. The method according to claim 1,
   wherein division of a compartment is performed by applying a hyperplane which is situated substantially perpendicularly to the direction of the greatest variance, which plane contains the centre of gravity of the set of colours.

4. The method according to claim 1,
   wherein the variance of a set of colours in that first direction is calculated by multiplying the covariance matrix twice with a vector in the said first direction.

5. The method according to claim 1,
   wherein the directions along which the variance is determined are formed by the directions of the axes of the colour space used and additional directions between each pair of said axis directions.

6. The method according to claim 1,
   wherein in the successive division of the colour space into compartments, that compartment which contains the set of colours with the greatest variance is always divided.

7. The method according to claim 1,
   wherein the stop criterion stipulates that a compartment in which the variance is smaller than a predetermined threshold is not divided further.

8. The method according to claim 1,
   wherein the stop criterion stipulates that the division ceases when a predetermined number of compartments has been reached.

9. The method according to claim 8,
   wherein the said predetermined number of compartments is 10.

10. The method according to claim 1,
    wherein the said test for consolidation into previous sets is based on the variances of said sets in their connecting direction.

11. The method according to claim 10,
    wherein the said test comprises the comparison of the sum of the squares of the variances of the relevant sets with the square of the distance of their centres of gravity.

12. The method according to claim 1,
    the method further comprises post-processing to remove transition effects along the edges of coloured surfaces in order to prevent said transition effects from influencing the end result of the quantisation.

13. The method according to claim 12,
    wherein the post-processing step includes
    searching for separate elements in the image,
    searching for the boundary between such an element and the background thereof and placing a partition line along the background at the location of the said boundary, and
    giving a single quantised colour to the element.

14. The method according to claim 13,
    wherein the placing of a partition line along the background at the location of a boundary between an element and the background thereof is performed by chain coding.

15. A method of automatically interpreting a colour image, comprising
    quantising colours present in the colour image to a restricted number, making, on the basis of the quantisation, a new colour image, and
    interpreting the new colour image, wherein the quantisation step is performed by the method of claim 1.

16. The method according to claim 15,
    wherein the interpretation classifies the image elements into types including, text elements, photographs and graphic elements.

17. The method according to claim 15,
    wherein the interpretation includes an automatic optical character recognition.

18. The method according to claim 15, wherein the interpretation includes an automatic recognition of securities.

19. An apparatus for quantising colours in a digital image, within a colour space, comprising
- an establishing unit to make a set of colours occurring in the image or in a preselected part thereof;
- a division unit to iteratively divide the colour space into a number of compartments, each compartment containing a subset of the colours of the image, said division unit being provided with
  - a selection unit to select a compartment for division on the basis of the variances of the existing compartments, and
  - a splitting unit to split said compartment into new compartments, the splitting unit continuing splitting until a predetermined stop criterion is met;
- a coding unit to code the colours in the image with a colour or code which represents the compartment in which they are situated;
- a consolidating unit to subject resulting sets of colours to a predetermined test and, on the basis of the results of said test, consolidate into previous sets, and the compartments corresponding thereto; and
- a variance calculator, to which said selection unit and said splitting unit are responsive, to calculate the variances of the sets of colours in the compartments in a predetermined number of directions.

20. The apparatus according to claim 19,
wherein the variance calculator calculates the variances of the sets of colours by determining a covariance matrix for each set of colours and calculating therefrom, respectively, the values of the variance of the set of colours in said predetermined directions.

21. The apparatus according to claim 19,
wherein the splitting unit is operable to split by applying a hyperplane situated substantially perpendicularly to the direction of the greatest variance, which plane contains the centre of gravity of the set of colours.

22. The apparatus according to claim 19,
wherein the variance calculator is operable to determine the variance of a set of colours in a first direction by multiplying the covariance matrix twice with a vector in the said first direction.

23. The apparatus according to claim 19,
wherein the variance calculator is operable to determine the variance in the directions of axes of the colour space used and additional directions between each pair of said axis directions.

24. The apparatus according to claim 19,
wherein the division unit, for each iteration, is operable to select and divide the colour space into that compartment which contains the set of colours with the greatest variance.

25. The apparatus according to claim 19,
wherein the division unit does not divide further a compartment in which the variance is smaller than a predetermined threshold.

26. The apparatus according to claim 19,
wherein the division unit ceases division when a predetermined number of compartments has been reached.

27. The apparatus according to claim 26,
wherein said predetermined number of compartments is 10.

28. The apparatus according to claim 19,
wherein said test for consolidating into previous sets is based on the variances of said sets in their connection direction.

29. The apparatus according to claim 28,
wherein said test comprises the comparison of the sum of the squares of the variances of the relevant sets with the square of the distance of their centres of gravity.

30. The apparatus according to claim 19, the apparatus further comprising
a post-processing unit to remove transition effects along the edges of coloured surfaces in order to prevent the same from influencing the end result of the quantisation.

31. The apparatus according to claim 30,
wherein the post-processing unit is provided with
- a first unit to search for separate elements in the image,
- a second unit to search for the boundaries between separated elements and background thereof, respectively, and a partition lines along the background at the locations of the said boundaries, and
- a third unit to give a single quantised colour to the element.

32. The apparatus according to claim 31,
wherein the post-processing unit, in placing a partition line along the background at the location of a boundary between an element and background thereof makes use of chain coding.

33. An apparatus for the automatic interpretation of a colour image, comprising
- a quantisation unit to quantise colours present in the colour image, to a restricted number, and, on the basis of the quantisation, to make a new colour image; and
- an interpretation unit to interpret the new colour image, wherein the quantisation is performed in accordance with the method of claim 1.

34. The apparatus according to claim 33,
wherein the interpretation unit is adapted to perform a classification of image elements into types including text elements, photographs and graphic elements.

35. The apparatus according to claim 33,
wherein the interpretation unit performs an automatic optical character recognition.

36. The apparatus according to claim 33,
wherein the interpretation unit performs an automatic recognition of securities.

37. A program embodied on a computer-readable medium, the program comprising
a code to cause the computer to perform the method according to claim 1.

38. A program embodied on a computer-readable medium, the program comprising
- a first code segment to quantise colours present in the colour image to a restricted number according to the method of claim 1 and to make, on the basis of the quantisation, a new colour image; and
- a second code segment to interpret the new colour image.

39. A program element for a computer, the program element comprising
a code to cause the computer to perform the method according to claim 1.

40. A program element for a computer, the program element comprising
- a first code segment to quantise colours present in the colour image to a restricted number according to the method of claim 1 and to make, on the basis of the quantisation, a new colour image; and
- a second code segment to interpret the new colour image.

41. A method of quantising colours in a digital image, within a colour space, comprising:
- a—making a set of colours occurring in the image or in a preselected part thereof;
- b—iteratively dividing the colour space into a number of compartments in a number of steps, each compartment containing a subset of the colours of the image, each step including
   - selecting a compartment for division on the basis of the variances of the existing compartments, and
   - dividing said compartment into new compartments, the division being carried out until a predetermined stop criterion is met,
   - wherein the selecting of a compartment for division and the dividing of the selected compartment into new compartments is based upon variances of the sets of colours in the compartments in a number of predetermined directions, and
   - the variance of each set of colours in a compartment is calculated by determining a covariance matrix which describes this set of colours and calculating therefrom the values of the variance of the set in said predetermined directions; and
- c—coding the colours in the image with a colour or code which represents the compartment in which they are situated,
- wherein the variance of a set of colours in that first direction is calculated by multiplying the covariance matrix twice with a vector in the said first direction.

42. A method of quantising colours in a digital image, within a colour space, comprising:
- a—making a set of colours occurring in the image or in a preselected part thereof;
- b—iteratively dividing the colour space into a number of compartments in a number of steps, each compartment containing a subset of the colours of the image, each step including
   - selecting a compartment for division on the basis of the variances of the existing compartments, and
   - dividing said compartment into new compartments, the division being carried out until a predetermined stop criterion is met,
   - wherein the selecting of a compartment for division and the dividing of the selected compartment into new compartments is based upon variances of the sets of colours in the compartments in a number of predetermined directions, and
   - the variance of each set of colours in a compartment is calculated by determining a covariance matrix which describes this set of colours and calculating therefrom the values of the variance of the set in said predetermined directions;
- c—coding the colours in the image with a colour or code which represents the compartment in which they are situated; and
- d—post-processing to remove transition effects along the edges of coloured surfaces in order to prevent said transition effects from influencing the end result of the quantisation.

43. An apparatus for quantising colours in a digital image, within a colour space, comprising:
- an establishing unit to make a set of colours occurring in the image or in a preselected part thereof;
- a division unit to iteratively divide the colour space into a number of compartments, each compartment containing a subset of the colours of the image, said division unit being provided with
   - a selection unit to select a compartment for division on the basis of the variances of the existing compartments, and
   - a splitting unit to split said compartment into new compartments, the splitting unit continuing splitting until a predetermined stop criterion is met;
- a coding unit to code the colours in the image with a colour or code which represents the compartment in which they are situated; and
- a variance calculator, to which said selection unit and said splitting unit are responsive, to calculate the variances of the sets of colours in the compartments in a predetermined number of directions by determining a covariance matrix for each set of colours and calculating therefrom, respectively, the values of the variance of the set of colours in said predetermined directions,
- wherein the variance calculator is operable to determine the variance of a set of colours in a first direction by multiplying the covariance matrix twice with a vector in the said first direction.

44. An apparatus for quantising colours in a digital image, within a colour space, comprising:
- an establishing unit to make a set of colours occurring in the image or in a preselected part thereof;
- a division unit to iteratively divide the colour space into a number of compartments, each compartment containing a subset of the colours of the image, said division unit being provided with
   - a selection unit to select a compartment for division on the basis of the variances of the existing compartments, and
   - a splitting unit to split said compartment into new compartments,
   - the splitting unit continuing splitting until a predetermined stop criterion is met;
- a coding unit to code the colours in the image with a colour or code which represents the compartment in which they are situated;
- a variance calculator, to which said selection unit and said splitting unit are responsive, to calculate the variances of the sets of colours in the compartments in a predetermined number of directions by determining a covariance matrix for each set of colours and calculating therefrom, respectively, the values of the variance of the set of colours in said predetermined directions; and
- a post-processing unit to remove transition effects along the edges of coloured surfaces in order to prevent the same from influencing the end result of the quantisation.

* * * * *